United States Patent
Kershaw et al.

(10) Patent No.: US 6,694,599 B1
(45) Date of Patent: Feb. 24, 2004

(54) METHOD OF CONNECTING COMMUTATOR BARS IN A CROSS-LINKED COMMUTATOR HAVING ADDITIONAL PARALLEL PATHS

(75) Inventors: Peter A. Kershaw, London (CA); Andrew Lakerdas, London (CA); Andrew Paul Smith, London (CA); John Van Duynhoven, St. Thomas (CA); Scott Cole, London (CA); Nicholas J. Glowacki, Thorndale (CA)

(73) Assignee: Siemens VDO Automotive, Inc., Chatham (CA)

(*) Notice: Subject to any disclaimer, the term of this patent is extended or adjusted under 35 U.S.C. 154(b) by 0 days.

(21) Appl. No.: 09/562,560

(22) Filed: May 2, 2000

Related U.S. Application Data
(60) Provisional application No. 60/146,547, filed on Jul. 30, 1999.

(51) Int. Cl.[7] ............................................... H02K 15/09
(52) U.S. Cl. .............................. 29/597; 29/598; 29/605; 310/233; 310/234
(58) Field of Search .......................... 29/597, 596, 598, 29/605, 733, 734, 736, 732; 310/198, 234, 235, 236, 254, 261, 206, 233; 242/433.3, 433

(56) References Cited

U.S. PATENT DOCUMENTS

| | | | |
|---|---|---|---|
| 512,853 A | 1/1894 | Wilkes | |
| 3,309,548 A | 3/1967 | Gough et al. | |
| 3,590,296 A | 6/1971 | Dumez | 310/234 |
| 4,227,107 A | 10/1980 | Ban et al. | 310/198 |
| 4,291,456 A * | 9/1981 | Peck, Jr. et al. | 29/597 |
| 4,292,559 A | 9/1981 | Auinger et al. | 310/206 |
| 4,326,140 A | 4/1982 | Rohloff | 310/234 |
| 4,716,330 A | 12/1987 | Heyraud | 310/233 |
| 4,876,472 A | 10/1989 | Shiraki et al. | 310/198 |
| 5,044,065 A | 9/1991 | Dyke et al. | 29/597 |
| 5,155,403 A | 10/1992 | Dyke et al. | 310/208 |
| 5,491,373 A | 2/1996 | Cooper et al. | 310/235 |
| 5,600,191 A | 2/1997 | Yang | 310/67 |
| 5,814,913 A | 9/1998 | Ojima et al. | 310/112 |
| 6,043,581 A | 3/2000 | Tanaka et al. | 310/197 |
| 6,075,305 A * | 6/2000 | Daikoku et al. | 310/233 |
| 6,127,759 A | 10/2000 | Tanaka et al. | 310/233 |
| 6,183,218 B1 | 2/2001 | Ojima et al. | 417/410.4 |
| 6,218,755 B1 | 4/2001 | Tanaka et al. | 310/204 |
| 6,236,137 B1 | 5/2001 | Tanaka et al. | 310/233 |
| 6,239,531 B1 | 5/2001 | McGaughey | 310/233 |
| 6,242,838 B1 | 6/2001 | Kiyose et al. | 310/233 |
| 6,242,839 B1 * | 6/2001 | Cefo | 310/233 |

FOREIGN PATENT DOCUMENTS

| | | | |
|---|---|---|---|
| EP | 0459629 | * | 4/1991 |
| EP | 1073182 | * | 1/2001 |

OTHER PUBLICATIONS

Siemens AG Drawing 325.40121.59 c.
Siemens AG Drawing 325.40121.66 b.
Elektrische Maschinen (Electric Machinery)—Authors: Theodor Bodefeld and Heinrich Sequenz Published in 1962.

* cited by examiner

Primary Examiner—Peter Vo
Assistant Examiner—Minh Trinh

(57) ABSTRACT

A method of linking commutator bars of a commutator for a motor wherein N is the number of magnetic poles of the motor and N is an even integer greater than 2. The method include a) arranging a plurality of commutator bars to be generally equally spaced in a circular arrangement to define the commutator, each commutator bar having a tang extending therefrom, b) contacting an end of a continuous, insulated conductive member to a tang, c) moving the member to contact a second tang which is disposed at an angle of 720°/N from the previously contacted tang to form a link, and when N is greater than four, repeating this step until N/2–1 links are created, d) moving the member to contact a tang which is immediately adjacent to the second tang contacted in step (c) such that the member defines a bridging portion between the adjacent tangs, e) repeating steps (c) and (d) and until all tangs have been contacted by the member, and f) cutting the bridging portion between adjacent tangs.

6 Claims, 3 Drawing Sheets

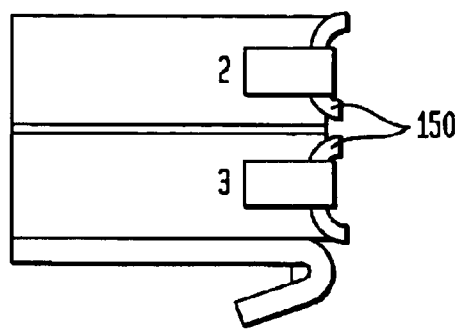
FIG. 4
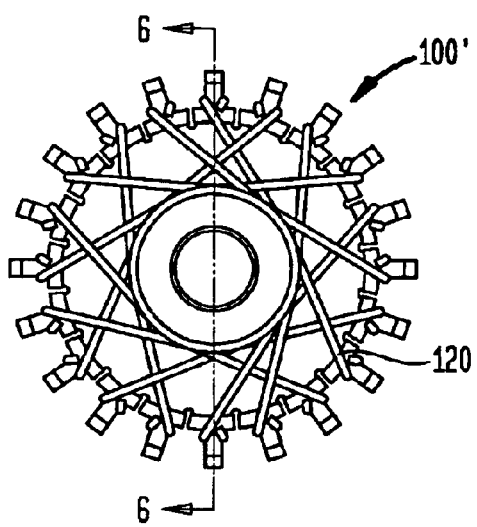
FIG. 5
FIG. 6
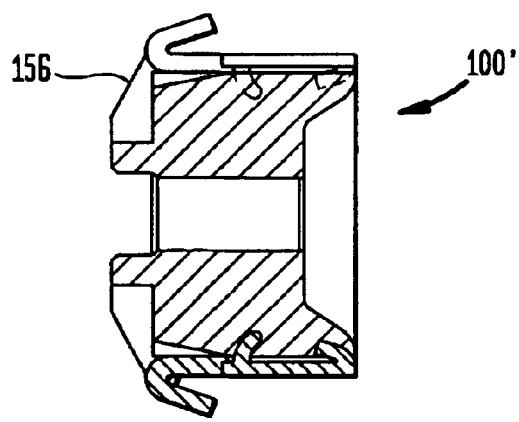

ent motor performance, the number of electrical brush pairs (1 positive and 1 negative) is half the number of magnetic poles. Thus, a four magnetic pole motor has two sets of brush pairs or four brushes in total. The brushes are equally spaced around the motor commutator and in the case of the four pole, four brush motor, the brush spacing is an angle of 90°. The electrical polarity of the sequence of the brushes is positive, negative, positive and negative, which ensures four equally balanced parallel circuits in the armature for optimum motor operation. To apply electrical power to the four brushes, the two positive brushes need to be interconnected and the two negative brushes need to be interconnected. A large brush hold is required with the associated electrical connections between the individual brush pairs since the brushes are spaced at 90° from each other.

METHOD OF CONNECTING COMMUTATOR BARS IN A CROSS-LINKED COMMUTATOR HAVING ADDITIONAL PARALLEL PATHS

This application is based on and claims the benefit of U.S. Provisional Application No. 60/146,547, filed on Jul. 30, 1999.

FIELD OF THE INVENTION

This invention relates to multipole D.C. electric motors with lap-wound coil configurations and, more particularly, to a commutator for a multipole motor having electrically cross-linked commutator bars.

BACKGROUND OF THE INVENTION

In a conventional multipole D.C. electric motor having a lap-wound coil configuration on the armature, for optimum motor performance, the number of electrical brush pairs (1 positive and 1 negative) is half the number of magnetic poles. Thus, a four magnetic pole motor has two sets of brush pairs or four brushes in total. The brushes are equally spaced around the motor commutator and in the case of the four pole, four brush motor, the brush spacing is an angle of 90°. The electrical polarity of the sequence of the brushes is positive, negative, positive and negative, which ensures four equally balanced parallel circuits in the armature for optimum motor operation. To apply electrical power to the four brushes, the two positive brushes need to be interconnected and the two negative brushes need to be interconnected. A large brush hold is required with the associated electrical connections between the individual brush pairs since the brushes are spaced at 90° from each other.

Recently, it has been proposed to link commutator bars of a wave-wound motor so as to reduce the number of brushes of the motor. However, the winding process is difficult since it is a two-part process requiring indexing and requiring that the commutator links be wound onto the armature with the armature windings. Furthermore, the resulting winding from the wave-wound process consumes much space since there is a great deal of wire between the lamination stack and the commutator.

Accordingly, there is a need to provide an improved commutator for a lap-wound motor by having electrically cross-linked commutator bars connected in a continuous winding process to provide additional parallel paths and thus reduce the number of brushes in a multipole motor.

SUMMARY OF THE INVENTION

An object of the present invention is to fulfill the need referred to above. In accordance with the principles of the present invention, this objective is obtained by a method which provides a commutator for a lap-wound motor wherein N is the number of magnetic poles of the motor and N is an even integer greater than 2. The method includes arranging a plurality of commutator bars to be generally equally spaced in a circular arrangement. Sets of commutator bars which are disposed at an angle of 720°/N therebetween are electrically connected together such that each set of connected commutator bars is electrically isolated from all other sets of connected commutator bars. A lap-winding is then connected to the commutator.

In accordance with another aspect of the invention, a method is provided to connect commutator bars of a commutator for a lap-wound motor, wherein N is the number of magnetic poles of the motor and N is an even integer greater than 2. The method includes arranging a plurality of commutator bars to be generally equally spaced in a circular arrangement to define a commutator. Each commutator bar has a tang extending therefrom. The method further includes:

a) contacting an end of a continuous, conductive member to a tang, b) moving the member to contact and link a tang which is disposed at an angle of 720°/N from the previously contacted tang and if N is greater than four, repeating this step until N/2−1 links are created, c) moving the member to contact a tang which is immediately adjacent to the last tang contacted in step b) such that the member defines a bridging portion between the adjacent tangs, d) repeating step c) until all tangs have been linked by said member, and e) cutting the bridging portion between said adjacent tangs, thereby electrically connecting certain of said tangs while electrically isolating said certain tangs from other electrically connected tangs.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

FIG. 4 is a plan view of hooked-shaped members forming from the cut bridging portion of FIG. 3;

FIG. 5 is a view of the commutator of FIG. 2 after cutting bridging portions;

FIG. 6 is a cross-sectional view of the commutator of FIG. 5 taken along the line 6—6;

DETAILED DESCRIPTION OF THE INVENTION

Figure 1:
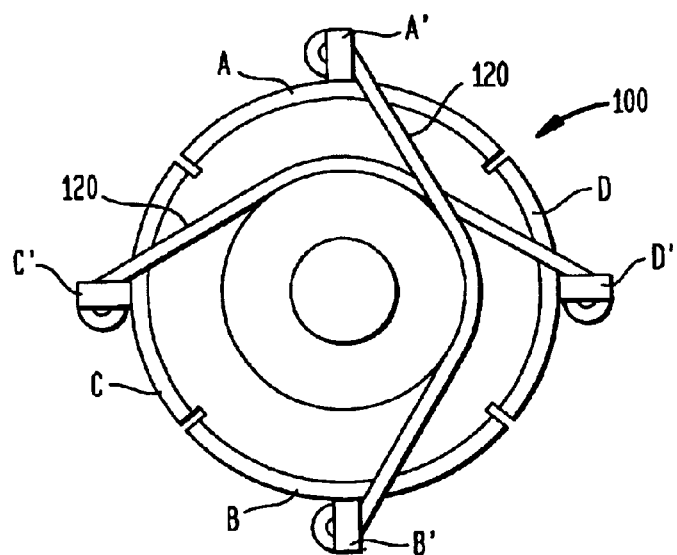
FIG. 1 is a plan view of a commutator provided in accordance with the principles of the present invention having cross-linked bar connections.

On a normal motor commutator, each individual commutator bar is electrically isolated from every other commutator bar. The invention provides a motor commutator, generally indicated at 100, which, when an electrical potential is applied to one of the commutator bars, that same potential is generally simultaneously present on N/2 bars. The commutator bars are equally spaced in a circular arrangement to define a commutator. N is the total number of magnetic poles of the motor. For example as shown in FIG. 1, in the case of a four pole motor, there are 4/2 or a minimum of two commutator bars A and B electrically connected together via connection structure 120 and separated by an angle of 720/N or, in this case, 180°. The connection structure joins tangs A' and B' of commutator bars A and B, respectively. All the bars on the commutator which are disposed at an angle of 720/N (180°) from each other are connected together. Thus, bars C and D are also electrically connected together via connection structure 120 at tangs C' and D'. In the illustrated embodiment, the connection structure 120 is preferably a single, solid strand of insulated copper wire but may be of any insulated, electrically conducting material, such as bars, etc. Each individual connected set of commutator bars (A and B) is electrically insulated from all other interconnected sets of commutator bars (C and D). For motors with poles greater than four, [(N/2)−1] links are created in each set to join N/2 commutator bars at relative angles of 720/N degrees.

When the above-described commutator 100 is used in a four pole, lap-wound armature style motor, advantageously, only two brushes are required, one at the positive potential and one at the negative potential. By cross-linking sets of commutator bars, the second two positive and negative brushes of the conventional four pole, lap-wound motor are not required since the electrical paths are created by the cross-linked connection structure 120. The motor employing the commutator 100 of the invention operates in the same manner and with the same characteristics as the conventional four brush system of the four pole motor.

With regard to commutators of the invention to be used on multipole motors with an even number of magnetic poles equal to or greater than four in number, the following will apply:

| | |
|---|---|
| Number of magnetic poles: | N (= even integer >2) |
| Minimum number of commutator bars: | N |
| Minimum number of sets of bars to be electrically connected: | N/2 |
| Angle between connected commutator bars: | 720°/N |
| Angle between motor brushes: | (360°/N)(1,3,5,...[N − 1]) |

With regard to the spacing or angle between brushes, for example, in a six-pole motor, the brushes may be spaced 60 or 180 degrees apart and in an eight-pole motor, the brushes may be spaced 45 or 135 degrees apart.

Figure 2:
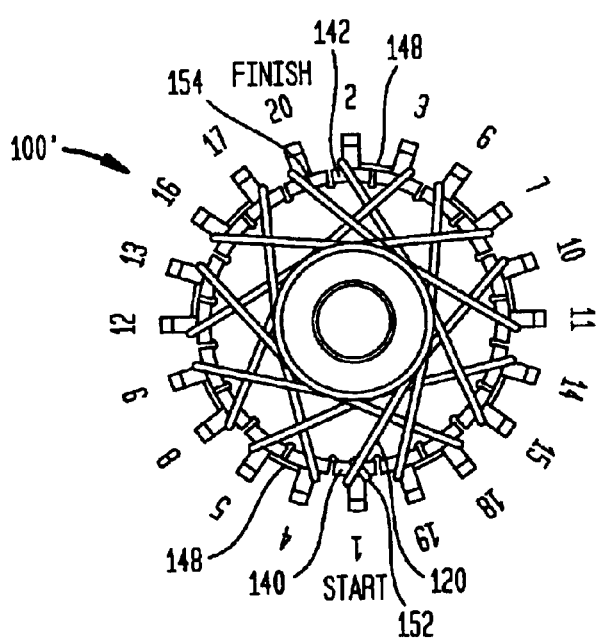
FIG. 2 is a plan view of a commutator for a four-pole motor provided in accordance with the principles of the present invention showing a winding pattern to cross-link sets of commutator bars.

A method of connecting commutator bars together to define the commutator of the type described above will be apparent with reference to FIGS. 2–6 and the following description. The process electrically connects commutator bar sets (for example, bars 140 and 142 in FIG. 2) on a four pole commutator 100' at angles of 720/N from each other but electrically isolated from all other interconnected commutator bar sets of the commutator 100'. In the embodiment of FIG. 2, the commutator 100' is for a four-pole motor. Thus, N=4 and 720°/N is 180°.

The method includes providing a commutator 100' with tangs formed on each commutator bar and then hooking, sequentially, a connection structure 120 around sets of tangs as illustrated in FIG. 2.

FIG. 2 shows the inventive hooking sequence for a four pole motor with a twenty slot commutator 100' having twenty tangs. The tangs are numbered 1–20 in FIG. 2. A continuous wire defining the connection structure 120 is used to link sets of commutator bars via the tangs. First, end 152 of the wire 120 is secured to tang number 1. The hooking sequence is from tang 1 to 2, 2 to 3, 3 to 4, 4 to 5, 5 to 6, and so on until tang 19 is connected or linked to tang 20. The other end 154 of the wire 120 is secured to tang number 20 to complete the cross-linking.

Figure 3:
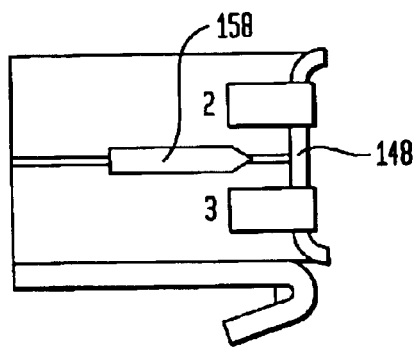
FIG. 3 is a plan view of a view showing a step of cutting a bridging portion between adjacent commutator bars using a cutting instrument.
Figure 7:
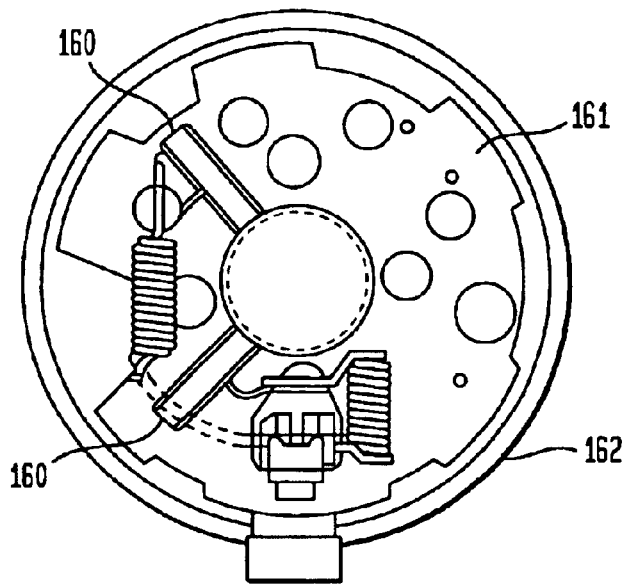
FIG. 7 is a top view of a brush card assembly of a motor of the invention which employs a cross-linked commutator.

With reference to FIGS. 3 and 4, after the hooking sequence is completed, a cutting sequence is initiated. During the cutting sequence, the bridging portion 148 of the connection structure 120 between tangs 2–3, 4–5, 6–7, 8–9, 10–11, 12–13, 14–15, 16–17 and 18–19 is cut and formed into a hook shape. As shown in FIG. 3, a cutting instrument 158, preferably a knife, is used to cut the bridging portion 148. Thereafter, as shown in FIG. 4, two hooked-shaped members 150 are formed from the cut bridging portion. The completed cross-linked commutator 100' is shown after the cutting process in FIGS. 5 and 6. The dashed line in FIG. 6 represents the extent of the wire pile after cross-linking. A conventional lap-winding can now be connected to the cross-linked commutator 100' in the conventional manner requiring no changes to the conventional winding tools for lap-wound armatures. Thus, the lap-winding is performed independently from linking of the commutator bars. With this structure and as shown in FIG. 7, the number of brushes 160 of a brush card assembly 161 of the motor 162 is reduced to two in all cases regardless of the value of N.

Although the method of joining sets of commutator bars has been described with regard to a twenty slot commutator, it can be appreciated that the method applies to connecting sets of commutator bars of commutators having fewer than or more than twenty bars.

Summarizing, wire first contacts a first tang and then the wire is moved to contact and link a second tang which is disposed at an angle of 720°/N from the first tang. For motors with poles greater than 4 (N>4) the pattern is repeated until [(N/2)−1] links are created. The wire is then wrapped around an adjacent tang immediate clockwise of the last tang hooked, such that the wire defines a bridging portion between those two tangs. This pattern is repeated until all tangs have been linked. In a four pole motor, this bridging portion is between the second and third tangs thereby electrically connecting the first and second tangs and the third and fourth tangs with the first and second tangs being electrically isolated from the third and fourth tangs. In motors with poles greater than four, the first group of N/2 tangs are electrically connected an angle of 720/N. After the [(N/2)−1] links are created, the wire is connected to an adjacent tang. The wire bridging portion between this adjacent tang and the previous 720/N tang is cut. Thus the second set of [(N/2)−1] linked tangs will be electrically isolated from the first set of tangs.

The insulation on the copper wire of the connection structure 120 is still present at the commutator bar hooks 150 (FIG. 4) and remains there until after the commutator 100' is placed on the armature stack assembly and the insulated wire coils are wound onto the armature and hooked sequentially to the commutator 100'. The armature coils and the commutator bar interconnecting wires are fused by fusion welding to the commutator bars in the conventional manner by a combination of heat and pressure. The insulation of the copper wires is vaporized locally during this process causing the complete electrical connections to be made.

Figure 8:
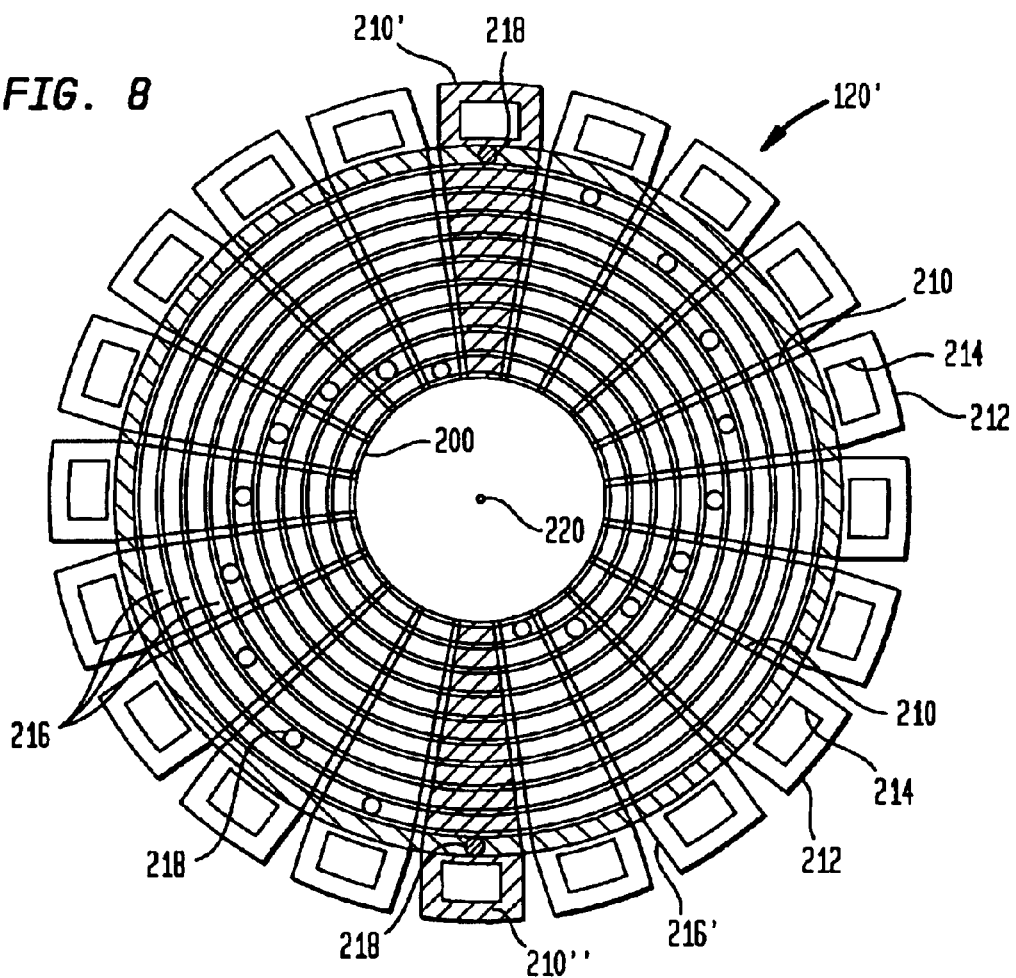
FIG. 8 is a plan view of a printed circuit board for cross-linking commutator bars in accordance with a second embodiment of the invention.

With reference to FIG. 8, connection structure 120', generally indicated at 120', is shown in accordance with a second embodiment of the invention. The connection structure 120' comprises a two-sided printed circuit board. The circuit board 120' is arranged at one end of a commutator (not shown) with the motor shaft (not shown) extending through a central hole 200 in the circuit board 120'. One side of the circuit board 120' includes a plurality of radially extending bars 210 having distal ends 212. Each distal end 212 extends beyond the outside diameter of the commutator and includes a cut-out 214. The cut-outs 214 receive the commutator bar hooks so as to be electrically connected to the distal ends 212. The radial bars 210 may be traces on the printed circuit board 120' or may be stamped pieces bonded to the circuit board.

A series of concentric rings 216 traces are defined on the second side of the printed circuit board 120'. Sets (in the illustrated embodiment pairs) of radial bars 210 are electrically connected by attaching the radial bars 210 in each set to a single ring 216 using through connectors 218 (vias). In the illustrated embodiment, the through connectors 218 are arranged in a spiral pattern on the printed circuit board 120', connecting each radial bar to a corresponding ring 216, which, in turn, is connected to another radial bar 180 degrees apart. For example, in the illustrated embodiment, radial bar 210' is connected with radial bar 210" via ring 216'. Thus, the connectors 218 electrically joining a set of radial bars are disposed substantially at a common radius from a center 220 of the printed circuit board 120', with connectors 218 electrically joining one set of radial bars being disposed on a radius from the center 220 which is different from another set of joined radial bars.

It can be appreciated that sets of three or more radial bars may be connected using this method. As in the first embodiment, the number of brushes of the motor is reduced to two in all cases regardless of the value of N.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of linking commutator bars of a commutator for a motor wherein N is the number of magnetic poles of the motor and N is an even integer greater than 2, the method including:
    a) arranging a plurality of commutator bars to be generally equally spaced in a circular arrangement to define said commutator, each commutator bar having a tang extending therefrom,
    b) contacting an end of a continuous, insulated conductive member to a tang,
    c) moving the member to contact a second tang which is disposed at an angle of 720°/N from the previously contacted tang to form a link, and when N is greater than four, repeating this step until N/2−1 links are created,
    d) moving the member to contact a tang which is immediately adjacent to the second tang contacted in step (c) such that the member defines a bridging portion between the adjacent tangs,
    e) repeating steps (c) and (d) until all tangs have been contacted by said member, and
    f) cutting the bridging portion between said adjacent tangs.

2. The method according to claim 1, further including forming the cut bridging portion into two hooked-shaped members.

3. The method according to claim 1, wherein said member is an insulated copper wire.

4. The method according to claim 1, wherein said bridging portion is cut by a knife.

5. The method according to claim 1, further comprising connecting a lap-winding to the commutator by fusing thereby vaporizing insulation from the conductive member at the tangs.

6. The method according to claim 1, wherein N is four.

* * * * *